United States Patent
Tang

(10) Patent No.: US 11,338,881 B2
(45) Date of Patent: May 24, 2022

(54) QUICK ASSEMBLY BICYCLE STEM STRUCTURE

(71) Applicant: Dynacraft BSC, Inc., Port Wentworth, GA (US)

(72) Inventor: Xie Xi Tang, Tianjin (CN)

(73) Assignee: Dynacraft BSC, Inc., Port Wentworth, GA (US)

( * ) Notice: Subject to any disclaimer, the term of this patent is extended or adjusted under 35 U.S.C. 154(b) by 145 days.

(21) Appl. No.: 16/730,673

(22) Filed: Dec. 30, 2019

(65) Prior Publication Data

US 2020/0277020 A1 Sep. 3, 2020

(30) Foreign Application Priority Data

Feb. 28, 2019 (CN) .......................... 201920258860.3

(51) Int. Cl.
*B62K 21/24* (2006.01)
*B62K 21/12* (2006.01)

(52) U.S. Cl.
CPC .............. *B62K 21/24* (2013.01); *B62K 21/12* (2013.01)

(58) Field of Classification Search
CPC ................................ B62K 21/24; B62K 21/12
See application file for complete search history.

(56) References Cited

U.S. PATENT DOCUMENTS

| | | | | |
|---|---|---|---|---|
| 575,109 A * | 1/1897 | Gulick | ................... | B62K 21/12 74/551.1 |
| 622,938 A * | 4/1899 | Alexander | ............ | E04B 1/2403 403/68 |
| 3,955,828 A * | 5/1976 | Boudreau | .............. | B62K 21/22 280/279 |
| 4,390,300 A * | 6/1983 | Foster | .................... | B62K 21/22 280/279 |
| 4,410,197 A | 10/1983 | St. Hillaire | | |
| 5,279,181 A * | 1/1994 | Boudreau | .............. | B62K 21/18 280/279 |

(Continued)

FOREIGN PATENT DOCUMENTS

| CN | 109018151 A | * 12/2018 |
|---|---|---|
| CN | 109018151 A | 12/2018 |
| JP | 09286368 A | * 11/1997 |

OTHER PUBLICATIONS

International Search Report and Written Opinion for Application No. PCT/IB2020/000156 dated Aug. 3, 2020 (7 pages).

*Primary Examiner* — Jacob D Knutson
(74) *Attorney, Agent, or Firm* — Michael Best & Friedrich LLP

(57) ABSTRACT

A quick assembly bicycle stem structure includes a front fork stem, a handlebar stem having a zigzag-shaped slot opening formed at a lower end thereof that is received in an upper section of the front fork stem, the zigzag-shaped slot opening including a first vertical slot and a second vertical slot that are spaced apart in relation to one another, a pin bolt coupled to the front fork stem and extending into the zigzag-shaped slot opening of the handlebar stem, the pin bolt configured to travel within the zigzag-shaped slot opening and to enter the second vertical slot from the first vertical slot when the front fork stem is rotated relative to the handlebar stem, and a nut assembly received over the handlebar stem and configured to threadedly engage the upper section of the front fork stem.

19 Claims, 2 Drawing Sheets

(56) References Cited

U.S. PATENT DOCUMENTS

| | | | | |
|---|---|---|---|---|
| 5,865,069 | A * | 2/1999 | Edwards | B62K 21/12 74/551.1 |
| 7,296,813 | B2 * | 11/2007 | Montague | B62K 15/00 280/276 |
| 8,517,406 | B2 * | 8/2013 | Diekman | B62K 9/02 280/282 |
| 2002/0139217 | A1 | 10/2002 | Montague et al. | |
| 2003/0123925 | A1 | 7/2003 | Kinzler et al. | |
| 2007/0138758 | A1 * | 6/2007 | Chao | B62K 21/24 280/279 |
| 2015/0376912 | A1 * | 12/2015 | Livacich | E04H 15/62 135/127 |

* cited by examiner

QUICK ASSEMBLY BICYCLE STEM STRUCTURE

CROSS-REFERENCE TO RELATED APPLICATIONS

This application claims priority to Chinese Utility Model Application ZL201920258860.3, titled 一种用于自行车的前叉和车把的 立管快装结构 ("Riser For A Bicycle Front Fork And Handlebar Quick Structure"), filed on Feb. 28, 2019, and granted on Nov. 12, 2019, as Chinese Utility Model Patent CN209617368U, the entire contents of which are hereby incorporated by reference herein.

BACKGROUND

The present invention relates to a bicycle stem, and in particular a quick assembly bicycle stem structure.

The handlebars of bicycle are connected with the front fork stem of the bicycle through a stem structure so as to control the direction of the bicycle. According to one type of a known bicycle stem structure, the front fork stem extends up through a head tube of the bicycle frame and a handlebar stem is inserted down into the front fork stem. A stem screw is inserted through the handlebar stem from the top and threadedly engages a wedge nut below the handlebar stem. As the stem screw is tightened using a wrench, a lateral face of the wedge nut engages against the interior surface of the front fork stem. As a result, the wedge nut and the front fork stem tube are fastened together by frictional engagement between them.

For example, a known bicycle stem structure includes a stem screw that passes through a locking mast inside the front fork stem. The lower end of the stem screw is inserted through the locking mast from above the front fork stem and is secured to a wedge nut below the locking mast. The locking mast and the wedge nut have complimentary beveled surfaces. When the stem screw is tightened, the wedge nut is pulled upwards to close against the locking mast. Further tightening of the stem screw will cause the beveled surface of the wedge nut to slide upon the beveled surface of the locking mast, which leads to a lateral displacement between the wedge nut and the locking mast. As a result, the wedge nut is immobilized against the inner surface of the front fork stem. Accordingly, the handlebar can be coupled onto the front fork stem tightly with the stem structure. Similarly, the stem structure can be loosened by loosening the stem screw in reverse with a wrench and the stem screw can be removed from the front fork stem. As a result, the handlebars can be removed together with the locking mast from the front fork stem.

These known stem structures for assembling the handlebars and the front fork may be susceptible to misalignment. Further, when the frictional engagement between the wedge nut and the front fork stem is reduced by wear, the handlebars can become loose or misaligned and must be adjusted to ensure safe operation of the bicycle. In order to repair the stem structure having a worn wedge nut, a wrench will be required. If the user does have a wrench to adjust the wedge nut, riding the bicycle may become dangerous.

Other known bicycle stem structures include an inserting stem and a locking tube coupled by a locking member rather than a stem screw. The locking tube is securely attached to the front fork stem of the bicycle. An upper section of the inserting stem is connected with the handlebar. A lower section of the inserting stem is inserted into the locking tube and is detachably coupled with the locking tube with the locking member. The locking member is configured such that chamfering on the end of the inserting stem will exert pressure on the locking member to couple the inserting stem and the locking tube, thereby allowing the handlebars with the inserting stem to be assembled with the front fork stem without the use of any tools.

However, bicycle stem structures with a locking member require may require more complicated assembly and may be susceptible to undesirable slack and play of the front fork, resulting in unsteadiness and a perception that the bicycle is unsafe and of poor quality.

SUMMARY

In one embodiment, the present disclosure relates to a quick assembly bicycle stem structure for assembling handlebars of a bicycle onto a front fork stem. The quick assembly bicycle stem structure includes a front fork stem, a handlebar stem having a zigzag-shaped slot opening formed at a lower end thereof that is received in an upper section of the front fork stem, the zigzag-shaped slot opening including a first vertical slot and a second vertical slot that are spaced apart in relation to one another, a pin bolt coupled to the front fork stem and extending into the zigzag-shaped slot opening of the handlebar stem, the pin bolt configured to travel within the zigzag-shaped slot opening and to enter the second vertical slot from the first vertical slot when the front fork stem is rotated relative to the handlebar stem, and a nut assembly received over the handlebar stem and configured to threadedly engage the upper section of the front fork stem.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Figure 1:
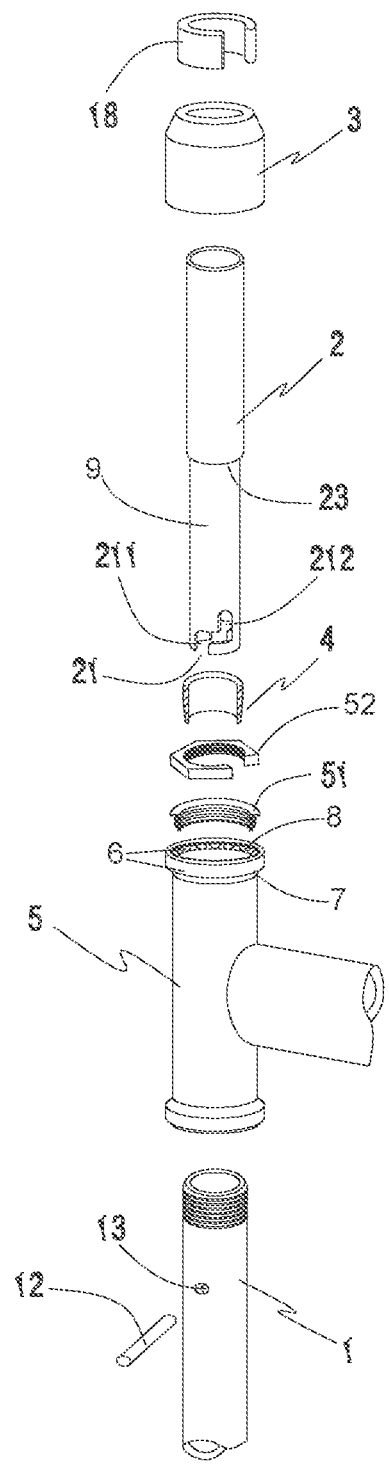
FIG. 1 is an exploded perspective view of a quick assembly bicycle stem structure according to one embodiment of the present disclosure.
Figure 2:
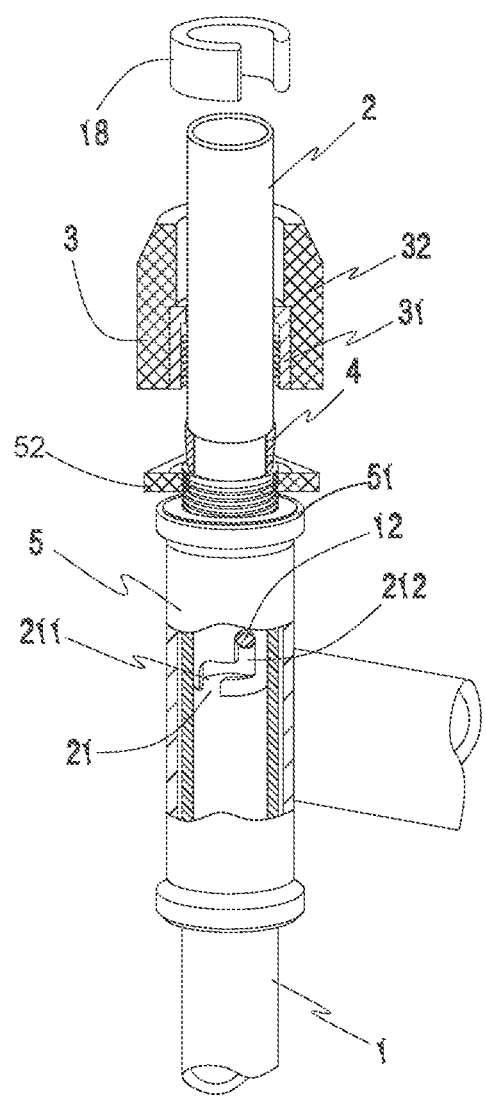
FIG. 2 is a partially exploded perspective view, in partial cross-section, of the quick assembly bicycle stem structure of FIG. 1.

As shown in FIGS. 1-2, a quick assembly bicycle stem structure (A) includes a handlebar stem (2) for installing handlebars (not shown) of a bicycle onto a front fork stem (1). The front fork stem (1) includes a tubular-shaped upper section having external screw threads proximate the top end of the front fork stem (1). When assembled, the front fork stem (1) is inserted up into a head tube (5) of the bicycle such that the upper section of the front fork stem (1) passes through the top end of the head tube (5).

The upper section of the front fork stem (1) is rotatably coupled to the head tube (5) via a bearing assembly (6). The bearing assembly includes a bearing cup (7) that is securely attached inside the head tube (5) at the top end of the head tube (5). The bearing cup receives a set of ball bearings (8) for rotatably engaging the front fork stem (1) passing through the bearing assembly. A threaded upper cone or race (51) has internal screw threads that mate with the external screw threads formed on the upper section of the front fork stem (1). The upper cone (51) is threaded onto the upper section of the front fork stem (1) and into contact with the ball bearings (8).

In addition, a locking ring (52) having internal threads that mate with the external screw threads formed on the upper section of the front fork stem (1) is threaded onto the upper section of the front fork stem (1) above the upper cone (51). The locking ring (52) is tightened against the upper cone (51) to lock the upper cone (51) in place and to secure the front fork stem (1) inside the head tube (5). This arrangement enables the front fork stem (1) to rotate freely relative to the head tube (5) via the ball bearing assembly inside the head tube (5) while reducing excess rotational play of the front fork stem (1).

The handlebar stem (2) includes a tubular-shaped lower end portion (9) that, when assembled, is inserted down into the upper section of front fork stem (1) inside the head tube (5). A zigzag-shaped slot opening (21) is formed in the lower end portion of the handlebar stem (2) at the bottom end of the handlebar stem (2). The zigzag-shaped slot opening (21) includes a pair of parallel slots, for example a first vertical slot (211) and a second vertical slot (212) that are laterally spaced apart in relation to one another.

As described in further detail below, the quick assembly bicycle stem structure (A) also includes a pin bolt (12) that is fixedly attached to upper section of the front fork stem (1) and extends radially inside the front fork stem (1). The pin bolt (12) is configured to extend and travel within the zigzag-shaped slot opening (21) of the handlebar stem (2) when the handlebar stem (2) is inserted into or removed from the front fork stem (1) for coupling and uncoupling the handlebar stem (2) and the front fork stem (1). For example, as described below, the pin bolt (12) may enter the second vertical slot (212) from the first vertical slot (211) when the front fork stem (1) is rotated relative to the handlebar stem (2).

During an assembly operation, the handlebar stem (2) may be axially inserted into the front fork stem (1) and rotated so as to vertically align the first vertical slot (211) of the zigzag-shaped slot opening (21) with the pin bolt (12), thereby allowing the pin bolt (12) to enter the zigzag-shaped slot opening (21) for quick assembly of the handlebar stem tube (2) and the front fork stem (1) without the use of tools.

In particular, when the first vertical slot (211) of the zigzag-shaped slot opening (21) is vertically aligned with the pin bolt (12), the handlebar stem (2) may be axially inserted further into the front fork stem (1) such that the pin bolt (12) travels within the first vertical slot (211). Then, the handlebar stem (2) is rotated (e.g., by turning the handlebars) relative to the front fork stem (1) so that the pin bolt (12) travels along the zigzag-shaped slot opening (21) laterally relative to the handlebar stem (2) from the first vertical slot (211) to the second vertical slot (212). Thereafter, the handlebar stem (2) may be axially inserted further into the front fork stem (1) such that the pin bolt (12) travels within the second vertical slot (212) into a locked position, as shown as FIG. 2.

Among other things, this arrangement also reduces the risk that the handlebar stem (2) will inadvertently disassemble from the front fork stem (1) in the event that the connection between the handlebar stem (2) and the front fork stem (1) becomes loosened. For example, locking the pin bolt (12), as described above, in the zigzag-shaped slot opening (21) prevents the handlebar stem (2) and the front fork stem (1) from being pulled directly axially apart. Instead, the handlebar stem (2) can be pulled axially only a small distance relative to the front fork stem (1) corresponding to the distance traveled by the pin bolt (12) in the second vertical slot (212). Before the handlebar stem (2) can be separated from the front fork stem (1), however, the handlebar stem (2) also must rotate relative to the front fork stem (1) so that the pin bolt (12) will travel into the first vertical slot (211) from the second vertical slot (212). As a result, the safety of the connection between the handlebar stem (2) and the front fork stem (1) is improved.

The angle of rotation relative to the front fork stem (1) for assembly or disassembly the handlebar stem (2) will depend upon the relative locations of the first vertical slot (211) and the second vertical slot (212) of the zigzag-shaped slot opening (21). The relative locations of the first vertical slot (211) and the second vertical slot (212) may be selected based upon several criteria. Greater lateral distances between the first vertical slot (211) and the second vertical slot (212) require greater angles of rotation for assembly or disassembly the handlebar stem (2), which can reduce risk that the handlebar stem (2) will inadvertently disassemble from the front fork stem (1). Smaller lateral distances between the first vertical slot (211) and the second vertical slot (212) require smaller angles of rotation for assembly or disassembly the handlebar stem (2), which can make the assembly or disassembly operation easier or more convenient.

In the illustrated embodiment, the pin bolt (12) is supported at one end in a pin bolt hole (13) formed in the wall of the front fork stem (1) and the pin bolt (12) extends at least partially into the interior of the front fork stem (1). Alternatively, the pin bolt (12) may be supported at both ends thereof in a pair of oppositely facing pin bolt holes (13) formed in the wall of the front fork stem (1) and may extend across the interior of the front fork stem (1).

In some embodiments, the pin bolt (12) can be riveted to the front fork stem (1) in order to prevent undesired play and maintain accurate positioning of the handlebar stem (2) relative to the front fork stem (1). Furthermore, the pin bolt (12) may be fixed to the front fork stem (1) such that the two ends of the pin bolt (12) do not extend outward beyond or outside the front fork stem (1). Since the ends of the pin bolt (12) do not protrude outside the wall of the front fork stem (1), the pin bolt (12) does not interfere with travel or rotation of the front fork stem (1) inside the bicycle head tube (5) during assembly or normal operation of the bicycle. In some embodiments, the ends of the pin bolt (12) can be secured inside the pin bolt holes (13) flush with the outer perimeter of the front fork stem (1).

In addition, the quick assembly bicycle stem structure (A) may also include a nut assembly (3) and a cone-shaped C ring (4) to help firmly secure the handlebar stem (2) to the front fork stem (1).

As shown in FIGS. 1 and 2, the cone-shaped C ring (4) is mounted on the handlebar stem (2) at a location along the length the handlebar stem (2) such that the smaller or lower end portion of the cone-shaped C ring (4) is received inside the front fork stem (1) when the handlebar stem (2) is inserted in the front fork stem (1) and the pin bolt (12) is received in the second vertical slot (212) of the zigzag-shaped slot opening (21). The smaller end portion of the cone-shaped C ring (4) is shaped and sized to fill the gap between the handlebar stem (2) and the front fork stem (1) to prevent undesirable play of the front fork stem (1) and to improve comfort, safety and the riding experience of the user.

The cone-shaped C ring (4) may be securely attached on the handlebar stem (2), for example, by interference fit or welding. In the illustrated embodiment, the cone-shaped C ring (4) is disposed about the circumference of a cylindrical step region of the handlebar stem (2). The step region of the handlebar stem (2) has a reduced diameter and forms a shoulder (23) on the handlebar stem (2). The step region may be coextensive with the lower end portion of the handlebar stem (2) that is inserted into the upper section of front fork stem (1). The cone-shaped C ring (4) is attached to the handlebar stem (2) in the step region with the larger or upper end of the cone-shaped C ring (4) abutting against the shoulder (23) formed by the step region. In this way, the cone-shaped C ring (4) is prevented from moving axially on the handlebar stem (2).

The nut assembly (3) has internal threads that mate with the external threads formed on the upper section of the front fork stem (1). The nut assembly (3) is received over the handlebar stem (2) above the locking ring (52) and is threaded onto the upper section of the front fork stem (1). The nut assembly (3) is configured to engage against the cone-shaped C ring (4) to prevent the handlebar stem (2) and the front fork stem (1) from being inadvertently separated, as described in further detail below.

Figure 3:
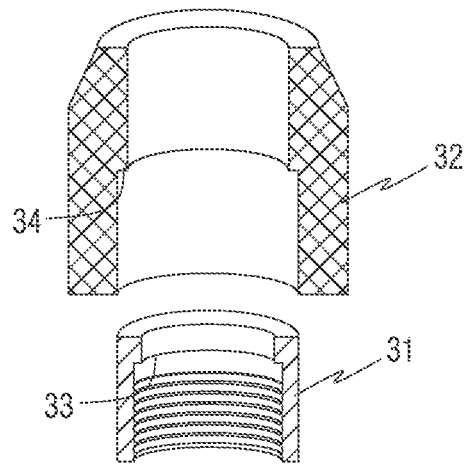
FIG. 3 is an exploded, cross-sectional view of the nut assembly of the quick assembly bicycle stem structure of FIG. 1.

Referring to FIGS. 2 and 3, the nut assembly (3) may include a ladder nut (31) and an outer cover (32) that are fixedly attached to one another by adhesive or cohesive bonding material, for example, hot melt adhesive, fasteners, snap-fit connections, inter-engaging elements, or any other suitable means. The ladder nut (31) may be formed of metal for providing a high strength, threaded connection to the front fork stem (1). In the illustrated embodiment, the internal threads of the nut assembly (3) correspond to the internal threads of the ladder nut (31). The ladder nut (31) also includes a first step section (33) formed around its interior surface that forms a shoulder (33*a*). When the nut assembly (3) is threaded onto the upper section of the front fork stem (1) as described above, the shoulder (33*a*) of the ladder nut (31) engages against the upper end the cone-shaped C ring (4) of the handlebar stem (2), thereby firmly securing the handlebar stem (2) and the front fork stem (1) together.

The outer cover (32) may be formed of plastic and may be secured to the ladder nut (31) using a hot-melt adhesive. The outer cover (32) covers the ladder nut (31) and provides a larger profile for the nut assembly (3) to facilitate grasping and turning the nut assembly (3). In the illustrated embodiment, the outer cover (32) has a step section (34) formed around its interior surface that abuts against the ladder nut (31) when the ladder nut (31) is mounted inside the outer cover (32). The outer cover (32) may also cover sharp edges of the metal ladder nut (31) to avoid injury to the user during operation. In addition, the outer cover (32) may have a textured or grooved outer surface for enhanced grip friction.

In some embodiments, the quick assembly bicycle stem structure (A) may also include a C-type locking ring (18) to prevent disengagement of the nut assembly (3). The C-type locking ring (18) may be fastened to the handlebar stem (2) on top of the nut assembly (3) so as to prevent loosening of the nut assembly (3) and to lock the nut assembly (3) in place.

Figure 4:
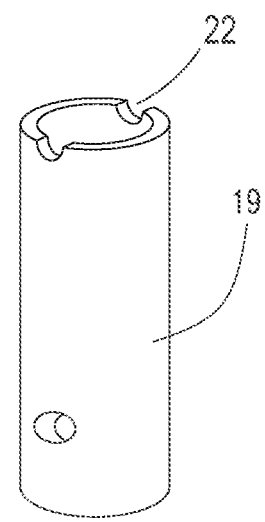
FIG. 4 is a perspective view of a front fork stem with an inner tube according to another embodiment of the present disclosure.
Figure 4:
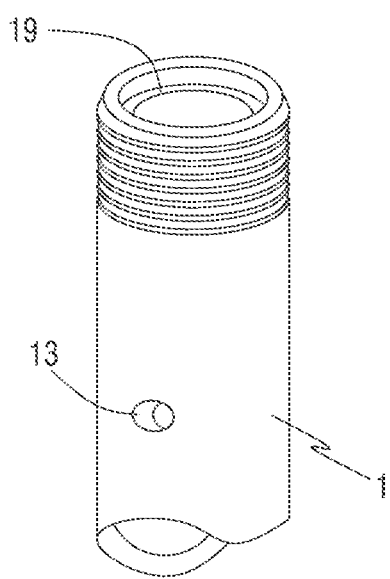
Figure 5:
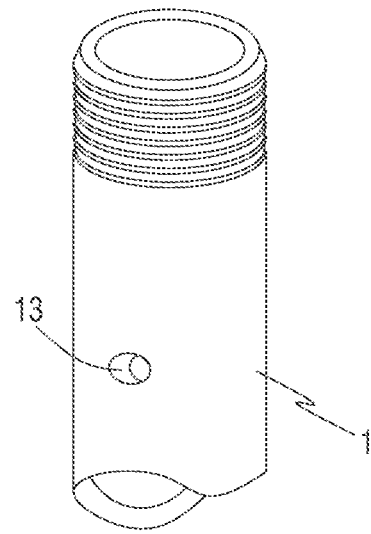
FIG. 5 is an exploded view of the front fork stem with an inner tube of FIG. 4.

In some embodiments, the quick assembly bicycle stem structure may also include an inner tube (19) mounted inside the front fork stem (1) for receiving the handlebar stem (2) therein, as shown in FIGS. 4 and 5. In particular, the inner tube (19) is dimensioned to adjust the effective inner diameter of the front fork stem (1) and to reduce the radial gap between the inner surface of the front fork stem (1) and the outer surface of the handlebar stem (2). For example, when the standard inner diameter of the front fork stem (1) too large compared to the outer diameter of the lower end portion of the handlebar stem (2), a gap between the handlebar stem (2) and the front fork stem (1) can introduce unwanted play between them. By reducing this gap, the inner tube (19) removes unwanted play and helps to maintain accurate positioning of the handlebar stem (2) inside the front fork stem (1).

In some embodiments, the inner tube (19) can be riveted or attached inside the front fork stem (1) with the pin bolt (12). Since the pin bolt (12) may be subject to shearing forces from turning the handlebar stem (2), the inner tube (19) can prevent the pin bolt (12) from breaking off inside the front fork stem (1) by filling the gap between the handlebar stem (2) and the front fork stem (1) and distributing the shearing forces.

In some embodiments, an alignment slot or channel (22) is formed in the wall of the inner tube (19) at the top end thereof, as shown in FIG. 5. The alignment slot (22) extends along a diameter of the inner tube (19) and is oriented parallel to the pin bolt (12) to help a user align the first vertical slot (211) of the zigzag-shaped slot opening (21) with the pin bolt (12) when the handlebar stem (2) is inserted into the front fork stem (1).

In some embodiments, the top end of the inner tube (19) may be positioned within the front fork stem (1) at a distance below the top end of the front fork stem (1) that is sufficient to prevent the inner tube (19) from obstructing the smaller end portion of the cone-shaped C ring (4) that is received inside the front fork stem (1).

Thus, the present disclosure provides, among other things, a quick assembly bicycle stem structure. The quick assembly bicycle stem structure may be configured for quick assembly of the handlebar stem tube (2) and the front fork stem (1) without the use of tools by the coordinated action of the pin bolt (12) and the zigzag-shaped slot opening (21). Moreover, engagement of the pin bolt (12) within the zigzag-shaped slot opening (21) can prevent inadvertent separation of the handlebar stem (2) and the front fork stem (1) in case the connection between the handlebar stem (2) and the front fork stem (1) becomes loosened, thereby improving rider safety.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

What is claimed is:

1. A quick assembly bicycle stem structure for assembling handlebars of a bicycle onto a front fork stem, the quick assembly bicycle stem structure comprising:
 a front fork stem;
 a handlebar stem having a zigzag-shaped slot opening formed at a lower end thereof that is received in an upper section of the front fork stem, the zigzag-shaped slot opening including a first vertical slot and a second vertical slot that are spaced apart in relation to one another by a horizontal slot;
 a cone-shaped C ring mounted on the handlebar stem, the cone-shaped C ring having a lower end received inside the front fork stem and an upper end that abuts against a shoulder formed on the handlebar stem;
 a pin bolt coupled to the front fork stem and extending into the zigzag-shaped slot opening of the handlebar stem, the pin bolt is configured to travel within the zigzag-shaped slot opening and to enter the second vertical slot from the first vertical slot when the front fork stem is rotated relative to the handlebar stem; and
 a nut assembly received over the handlebar stem and configured to threadedly engage the upper section of the front fork stem,
 wherein the second vertical slot extends above the horizontal slot a distance greater than a width of the pin bolt.

2. The quick assembly bicycle stem structure of claim 1, wherein the cone-shaped C ring is mounted on the handlebar stem with an interference fit.

3. The quick assembly bicycle stem structure of claim 2, wherein the nut assembly includes a ladder nut having internal threads configured to threadedly engage external threads formed in the upper section of the front fork stem and an outer cover with a gripping surface secured to the ladder nut.

4. The quick assembly bicycle stem structure of claim 3, wherein the ladder nut includes an internal shoulder that abuts against the upper end of the cone-shaped C ring.

5. The quick assembly bicycle stem structure of claim 4, wherein the outer cover includes a step section formed around an interior surface of the outer cover that abuts against an end of the ladder nut.

6. The quick assembly bicycle stem structure of claim 1, wherein the pin bolt is supported in at least one pin bolt hole formed in an outer wall of the front fork stem and the pin bolt does not extend outside the front fork stem.

7. The quick assembly bicycle stem structure of claim 1, further comprising:
 an upper cone threadedly engaged with the upper section of the front fork stem, the upper cone configured to mate with a ball bearing of a bicycle head tube; and
 a locking ring threadedly engaged with the upper section of the front fork stem against the upper cone.

8. The quick assembly bicycle stem structure of claim 1, further comprising:
 a C locking ring secured to the handlebar stem on top of the nut assembly.

9. The quick assembly bicycle stem structure of claim 1, further comprising:
 an inner tube mounted inside the front fork stem and configured to receive the lower end of the handlebar stem therein,
 wherein inner tube is riveted inside the front fork stem with the pin bolt.

10. The quick assembly bicycle stem structure of claim 9, wherein the inner tube has a top end that receives the lower end of the handlebar stem, an alignment slot oriented parallel to the pin bolt that is formed at the top end of the inner tube, and a top end of the inner tube is positioned below the top end of the front fork stem.

11. A quick assembly bicycle stem structure for assembling handlebars of a bicycle onto a front fork stem, the quick assembly bicycle stem structure comprising:
 a front fork stem;
 a handlebar stem having a zigzag-shaped slot opening formed at a lower end thereof that is received in an upper section of the front fork stem, the zigzag-shaped slot opening including a first vertical slot and a second vertical slot that are spaced apart in relation to one another;
 a pin bolt coupled to the front fork stem and extending into the zigzag-shaped slot opening of the handlebar stem, the pin bolt is configured to travel within the zigzag-shaped slot opening and to enter the second vertical slot from the first vertical slot when the front fork stem is rotated relative to the handlebar stem;
 a nut assembly received over the handlebar stem and configured to threadedly engage the upper section of the front fork stem; and
 a cone-shaped C ring mounted on the handlebar stem, the cone-shaped C ring having a lower end received inside the front fork stem and an upper end that abuts against a shoulder formed on the handlebar stem.

12. The quick assembly bicycle stem structure of claim 11, wherein the pin bolt is supported in at least one pin bolt hole formed in an outer wall of the front fork stem and the pin bolt does not extend outside the front fork stem.

13. The quick assembly bicycle stem structure of claim 11, wherein the pin bolt is cylindrical.

14. The quick assembly bicycle stem structure of claim 11, wherein the nut assembly includes a ladder nut having internal threads configured to threadedly engage external threads formed in the upper section of the front fork stem and an outer cover with a gripping surface secured to the ladder nut.

15. The quick assembly bicycle stem structure of claim 14, wherein the ladder nut includes an internal shoulder that abuts against the upper end the of cone-shaped C ring and the outer cover includes a step section formed around an interior surface of the outer cover that abuts against an end of the ladder nut.

16. A quick assembly bicycle stem structure for assembling handlebars of a bicycle onto a front fork stem, the quick assembly bicycle stem structure comprising:
 a front fork stem;
 a handlebar stem having a zigzag-shaped slot opening formed at a lower end thereof that is received in an upper section of the front fork stem, the zigzag-shaped slot opening including a first vertical slot and a second vertical slot that are spaced apart in relation to one another;
 a pin bolt coupled to the front fork stem and extending into the zigzag-shaped slot opening of the handlebar stem, the pin bolt is configured to travel within the zigzag-shaped slot opening and to enter the second vertical slot from the first vertical slot when the front fork stem is rotated relative to the handlebar stem;
 a nut assembly received over the handlebar stem and configured to threadedly engage the upper section of the front fork stem;
 an upper cone threadedly engaged with the upper section of the front fork stem, the upper cone configured to mate with a ball bearing of a bicycle head tube; and a locking ring threadedly engaged with the upper section of the front fork stem against the upper cone.

17. The quick assembly bicycle stem structure of claim 16, further comprising:
a cone-shaped C ring mounted on the handlebar stem, the cone-shaped C ring having a lower end received inside the front fork stem and an upper end that abuts against a shoulder formed on the handlebar stem.

18. The quick assembly bicycle stem structure of claim 17, wherein the nut assembly includes a ladder nut having internal threads configured to threadedly engage external threads formed in the upper section of the front fork stem and an outer cover with a gripping surface secured to the ladder nut.

19. The quick assembly bicycle stem structure of claim 18, wherein the ladder nut includes an internal shoulder that abuts against the upper end of the cone-shaped C ring and the outer cover includes a step section formed around an interior surface of the outer cover that abuts against an end of the ladder nut.

* * * * *